US011538210B1

(12) United States Patent
Lao et al.

(10) Patent No.: US 11,538,210 B1
(45) Date of Patent: Dec. 27, 2022

(54) TEXT IMPORTANCE SPATIAL LAYOUT

(71) Applicant: Adobe Inc., San Jose, CA (US)

(72) Inventors: Cheryl Lao, Toronto (CA); William F. Kraus, Bainbridge Island, WA (US); Paul John Asente, Redwood City, CA (US); Jose Ignacio Echevarria Vallespi, San Jose, CA (US); Craig Steven Kaplan, Waterloo (CA); Daniel John Vogel, Waterloo (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/532,059

(22) Filed: Nov. 22, 2021

(51) Int. Cl.
*G06F 17/00* (2019.01)
*G06T 11/60* (2006.01)
*G06F 40/109* (2020.01)
*G06F 40/30* (2020.01)

(52) U.S. Cl.
CPC ............ *G06T 11/60* (2013.01); *G06F 40/109* (2020.01); *G06F 40/30* (2020.01); *G06T 2210/12* (2013.01)

(58) Field of Classification Search
CPC ... G06T 11/60; G06T 2210/12; G06F 40/109; G06F 40/30
See application file for complete search history.

(56) References Cited

U.S. PATENT DOCUMENTS 7,340,678 B2 * 3/2008 Chiu .................. G06F 3/04815
707/E17.119
2004/0243388 A1 * 12/2004 Corman ................ G06F 40/211
704/1

(Continued)

FOREIGN PATENT DOCUMENTS

| CN | 103838801 A | * | 6/2014 | ....... | G06F 17/30864 |
| CN | 113792553 A | * | 12/2021 | | |
| CN | 111966828 B | * | 5/2022 | ............. | G06F 16/35 |

OTHER PUBLICATIONS

Bruno, E., et al, "BlockWeb: An IR Model for Block Structured Web Pages", DOI: 10.1109/CBMI.2009.36, 2009 Seventh International Workshop on Content-Based Multimedia Indexing, pp. 219-224, Jun. 1, 2009 (Year: 2009).*

(Continued)

*Primary Examiner* — Laurie A Ries
(74) *Attorney, Agent, or Firm* — FIG. 1 Patents

(57) ABSTRACT

In aspects of text importance spatial layout, a computing device implements a processing device to receive a text importance vector that includes designations of visual properties for constituent words of a text phrase. Spatial layouts of the text phrase are determined, with each spatial layout being a different displayable representation of the constituent words arranged based on the designations of the visual properties in the text importance vector for each of the constituent words. Feature vectors are generated, each feature vector represents a spatial layout of the text phrase and includes measurement properties of each of the constituent words in the respective spatial layout. The spatial layouts are ranked based on a metric that indicates a degree of similarity of the measurement properties of each of the constituent words in a respective spatial layout matching to the visual properties for the constituent words as designated in the text importance vector.

20 Claims, 6 Drawing Sheets

(56) References Cited

U.S. PATENT DOCUMENTS

| | | | | |
|---|---|---|---|---|
| 2014/0270482 A1* | 9/2014 | Chakraborty | .......... | G06V 20/10 |
| | | | | 382/154 |
| 2015/0347576 A1* | 12/2015 | Endert | ................ | G06F 16/3323 |
| | | | | 707/724 |
| 2019/0311301 A1* | 10/2019 | Pyati | ..................... | G06F 16/901 |

OTHER PUBLICATIONS

Tran, Thy, "Exploiting Unlabelled Data for Relation Extraction", The University of Manchester (UK), ProQuest Dissertations Publishing, 2021, pp. 1-201 (Year: 2021).*

Hakami, Huda, "A Study on Learning Representations for Relations Between Words", The University of Liverpool (UK), ProQuest Dissertations Publishing, 2020, pp. 1-198. (Year: 2020).*

Tang, Pingjie, "Multi-View Representation Learning: Approaches and Applications", University of Notre Dame, ProQuest Dissertations Publishing, 2020, pp. 1-157. (Year: 2020).*

* cited by examiner

TEXT IMPORTANCE SPATIAL LAYOUT

BACKGROUND

Generally, graphics designers and other computer users utilize computer-based image editing and graphics design software applications to develop many different types of digital artworks and display text layouts, such as images and layouts that are designed for posters, magazine pages, flyers, book pages, advertisements, and any other type of design documents. Text and other image objects are often incorporated in digital images, such as to enhance an image and/or to add more context to the visual content of the image. Editing the appearance of text depicted in digital images is a common aspect of developing display text layouts, and specifically, the visual emphasis of words displayed in a text layout can readily affect how text is interpreted by a reader. In graphics design, text is often limited to a specific copy space associated with geometric restrictions or regions in a composition. In order to emphasize certain words over others in a packed rectangular text layout, a designer needs to resize and rearrange all of the words in a text layout each time a change is made, while also conforming to the space constraints.

Typically, the process of designing aesthetically pleasing text layouts that emphasize some words over others is difficult and time-consuming for designers, particularly when changes and updates to the text content changes the emphasis of the words in a text layout. Packed rectangular text layouts are a common design motif, however the scaling, alignment, and manual adjustments needed to maintain a text layout with varying word sizes can be tedious for designers, particularly when assessing the near infinite possible combinations of word size, word spacing, and overall layout. Changes in word length or scale may exceed the rectilinear constraints of a layout, and having to manually adjust and re-adjust all of the words in the design of the layout to incorporate text changes is tedious and time consuming for a user.

SUMMARY

This Summary introduces features and concepts of text importance spatial layout, which is further described below in the Detailed Description and shown in the Figures. This Summary should not be considered to describe essential features of the claimed subject matter, nor used to determine or limit the scope of the claimed subject matter.

Aspects of text importance spatial layout are described. A computing device implements a text layout manager, which receives a text importance vector that includes designations of visual properties for constituent words of a text phrase received as a text input. The visual properties for the constituent words of the text phrase can be modified by the text layout manager to reflect the relative weight of a word in the text importance vector as a representation of the semantic importance of that word in a spatial layout of the text phrase. The visual properties for the constituent words of the text phrase can include a text size, a font style, or a color of the constituent words, as well as any other type of visual property. The text layout manager can also receive a designation of a bounding box as an input, and the bounding box defines a rectilinear constraint on a layout of the constituent words of the text phrase.

The text layout manager can determine spatial layouts of the text phrase, where each spatial layout is a different displayable representation of the constituent words arranged based in part on the visual properties for each of the constituent words as designated in the text importance vector. The text layout manager can also determine one or more of the spatial layouts with the constituent words of the text phrase conformed within an aspect ratio of the bounding box. In implementations, the text layout manager optimizes multiple objectives to determine the spatial layouts of the text phrase, such as based on the relative weight of two objectives that include a semantic importance of the constituent words reflected in a spatial layout, and the spatial layout of the text phrase conforms to an aspect ratio of a bounding box.

Additionally, based on the relative weight of multiple objectives, the text layout manager can deviate from the aspect ratio of the bounding box to maintain a spatial layout of the text phrase, giving more weight to the semantic emphasis of the constituent words. Alternatively, the text layout manager can give more weight to maintaining the aspect ratio of the bounding box over the semantic emphasis of the constituent words the spatial layout of the text phrase. The text layout manager can modify the visual properties for each of the constituent words to reflect a relative weight of a constituent word in the text importance vector as a representation of a semantic importance of the constituent word in a spatial layout of the text phrase.

The text layout manager is also implemented to generate multiple feature vectors, where each feature vector represents a respective spatial layout of the text phrase. A feature vector can include one or more measurement properties of each of the constituent words in a respective spatial layout, where a measurement property of a constituent word in a feature vector designates a displayable feature of the constituent word, such as word height, rotation, area, diagonal, scale, color, style, and/or any other of the many possible text properties. In implementations, a spatial layout may be defined by multiple feature vectors that each represent a different objective used to determine the spatial layout, and the text layout manager can optimize the multiple, different objectives to determine the spatial layout based on relative weights of the multiple, different objectives.

The text layout manager can then rank the spatial layouts based on a metric that indicates a degree of similarity of the measurement properties of each of the constituent words in a respective spatial layout matching to the visual properties for the constituent words as designated in the text importance vector. The spatial layouts can be ranked based on the metric that indicates a degree of similarity of the text importance vector to each feature vector that represents a respective spatial layout. In implementations, the metric to rank the spatial layouts is a difference or distance between the text importance vector and each of the respective feature vectors. The spatial layouts of the text phrase can then be displayed, such as in a user interface and prioritized according to the ranking of the spatial layouts.

BRIEF DESCRIPTION OF THE DRAWINGS

Implementations of text importance spatial layout are described with reference to the following Figures. The same numbers may be used throughout to reference similar features and components that are shown in the Figures.

DETAILED DESCRIPTION

Figure 1:
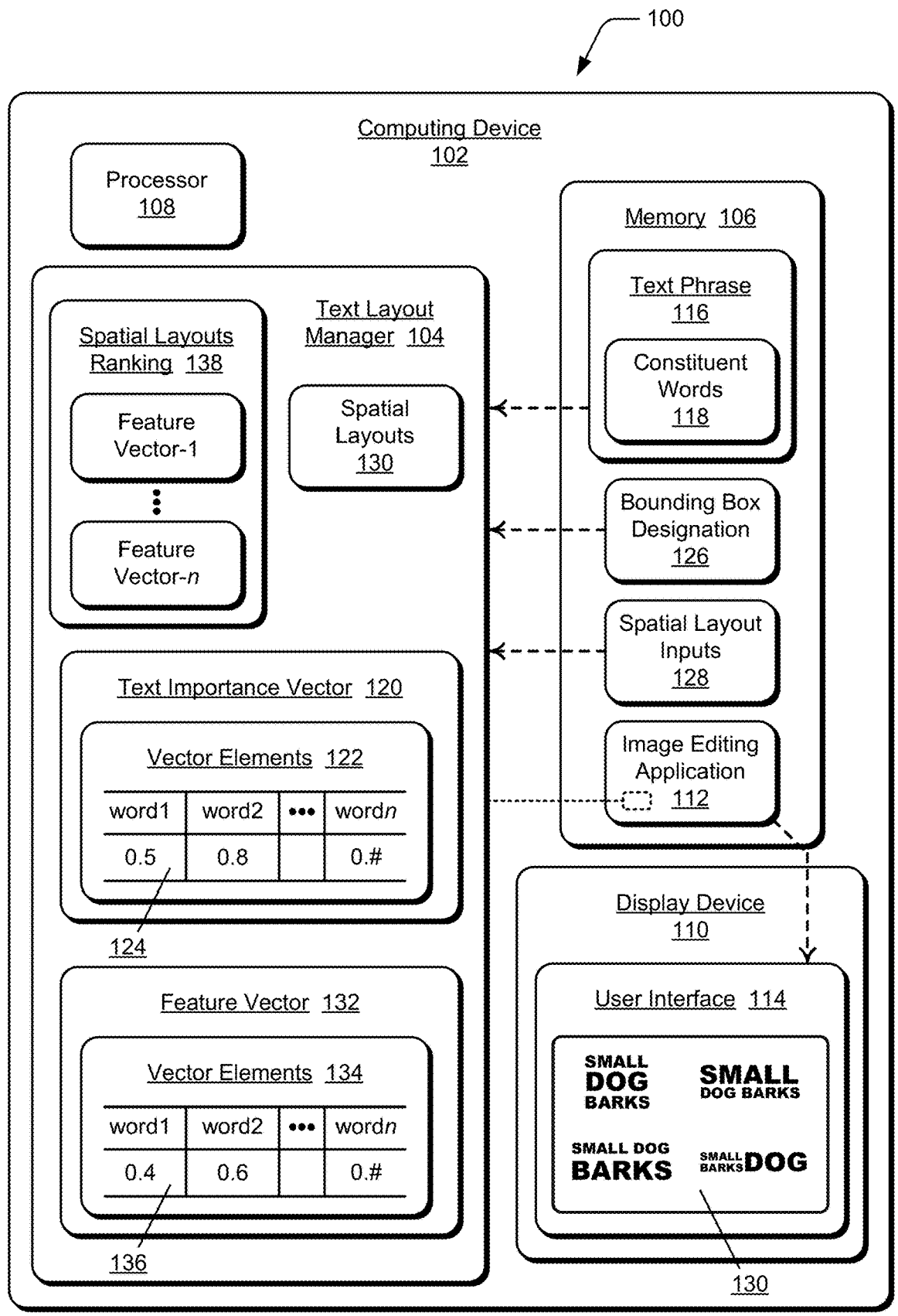
FIG. 1 illustrates an example of a text layout manager and computing device that can implement aspects of the techniques for text importance spatial layout, as described herein.

Implementations of text importance spatial layout are described, and provide techniques to facilitate using semantic emphasis of text as a parameter for generating text importance spatial layouts. Generally, emphasis in speech can be analogous in a visual presentation as to how someone might emphasize the importance and nuances of particular words, and a display of larger, more colorful, and/or stylized words connotes that emphasis. Editing the appearance of text depicted in digital images is a common aspect of developing display text layouts, and specifically, the visual emphasis of words displayed in a text layout can readily affect how text is interpreted by a reader. In graphics design, text is often limited to a specific copy space associated with geometric restrictions or regions in a composition. In order to emphasize certain words over others in a packed rectangular text layout, a designer needs to resize and rearrange all of the words in a text layout each time a change is made, while also conforming to the space constraints.

Typically, the process of designing aesthetically pleasing text layouts that emphasize some words over others is difficult and time-consuming for designers, particularly when changes and updates to the text content changes the emphasis of the words in a text layout. However the scaling, alignment, and manual adjustments needed to maintain a text layout with varying word sizes can be tedious for designers, particularly when assessing the near infinite possible combinations of word size, word spacing, and overall layout. Changes in word length or scale may exceed the rectilinear constraints of a layout, and having to manually adjust and re-adjust all of the words in the design of the layout to incorporate text changes is tedious and time consuming for a user.

In aspects of text importance spatial layout, as described herein, the relative semantic importance of each word in a text phrase can be represented by a text importance vector, and the difference between the desired text emphasis and feature vectors representing the visual properties for different layouts of the words in the text phrase can be used to curate a set of text layout variations for user consideration. The described techniques flexibly accommodate different visual emphasis attributes, such as for word rotation, scale, color, height, and any other type of word attribute. By automatically generating text spatial layout options that retain the desired word emphasis as reflected in the visual properties of the text, a graphics designer can quickly develop and generate multiple text spatial layout options for the words in a text phrase, while also conforming to the space constraints of a bounding box.

A text importance spatial layout may also be referred to as a packed rectangular text layout, which can be any arrangement of text having certain characteristics, such as size, color, style, or spatial position, and individual words and/or glyphs are differentiated from other words and/or glyphs in order to convey relative semantic importance to a reader beyond what is perceived from simply reading the words. One example of this is a spatial layout as a visual arrangement of words and/or individual glyphs using various transformations, such as scaling and rotation so that the resulting layout completely or approximately fills a rectangular area, and the white space delineating the boundaries between the words is kept to a minimum.

It should also be noted that, although the text spatial layouts described herein and shown in the figures are generally packed rectangular text layouts, the described techniques may be applied for any layout style in which words can have different emphasis, such as based on various visual properties that may include a text size, a font style, a text color, or any other type of visual property. For example, a different layout style may have each word displayed on a separate line, each in a different text size, and the words do not fill-in the shape of a rectangle. The described techniques for text importance spatial layout can be applied to this example different layout style, which has a bounding box (e.g., the rectangle) and a text attribute (e.g., the text size).

In aspects of the described aspects of text importance spatial layout, a text importance vector representing the semantic importance of words in a text phrase can be compared with a feature vector representing the measurement properties of the same text in a packed rectangular text layout. This vector comparison can then be used to prioritize how well each text spatial layout meets the original semantic importance design criteria. This approach can also be extended to multiple objectives, such as also including the aspect ratio of a bounding box as a design criteria, and other text layout motifs.

In aspects of text importance spatial layout, a computing device implements a text layout manager, which receives a text importance vector that includes designations of visual properties for constituent words of a text phrase received as a text input. The visual properties for the constituent words can include a text size, a font style, a color of the constituent words, or any other type of visual property. The text layout manager can modify the visual properties for each of the constituent words to reflect a relative weight of a constituent word in the text importance vector as a representation of a semantic importance of the constituent word in a spatial layout of the text phrase. The text layout manager can also receive a bounding box designation as an input, and an aspect ratio of the bounding box defines a suggested rectilinear constraint on a layout of the constituent words of the text phrase. In implementations, the text layout manager may also receive one or more additional spatial layout inputs, such as any type of a word or text attribute used to create emphasis variations and spatial layouts of the text phrase.

The text layout manager can then determine the spatial layouts of the text phrase, where each spatial layout is a different displayable representation of the constituent words arranged for display in a user interface. Each of the spatial layouts is determined by the text layout manager based in part on the visual properties in the text importance vector for each of the constituent words. A spatial layout can be defined by multiple feature vectors that each represent a different objective used to determine the spatial layout, and the text layout manager is implemented to optimize the multiple, different objectives to determine the spatial layout based on relative weights of the multiple, different objectives. The text layout manager can optimize multiple objectives to determine a spatial layout, where the multiple objectives include a semantic importance of the constituent words reflected in a spatial layout, and the spatial layout of the text phrase conforms to an aspect ratio of the bounding box.

In implementations, the text layout manager can determine the spatial layouts of the text phrase based on the bounding box and optimized based on a semantic importance of the constituent words as designated by the visual properties in the text importance vector. For example, the text layout manager can deviate from the bounding box in favor of maintaining a spatial layout of the text phrase based on the semantic emphasis of the constituent words in the text phrase. Alternatively, the text layout manager can give more weight to maintaining the aspect ratio of the bounding box over the semantic emphasis of the constituent words in the spatial layout of the text phrase, such as when a designer is limited to a specific copy space associated with geometric restrictions or regions in a design project.

The text layout manager is also implemented to generate multiple feature vectors, where each feature vector represents a respective spatial layout of the text phrase. A feature vector can include one or more measurement properties of each of the constituent words in a respective spatial layout, representing the visual relevance of each variation of the spatial layouts. A feature vector has vector elements which include measurement properties of each of the constituent words in a respective spatial layout. In implementations, a spatial layout can be represented by multiple feature vectors, each representing a different design objective for the constituent words of the text phrase. A measurement property of a constituent word in a feature vector represents a measurement property of a displayable feature of the constituent word, such as word height, rotation, area, diagonal, scale, color, style, and/or the many other possible text features that may be used to emphasize text in a visual layout.

The text layout manager is also implemented to rank the spatial layouts based on a metric that indicates a degree of similarity of the measurement properties of each of the constituent words in a respective spatial layout matching to the visual properties for the constituent words, as designated in the text importance vector. The spatial layouts can be ranked based on the metric that indicates a degree of similarity of the text importance vector to each feature vector that represents a respective spatial layout. In implementations, the text layout manager ranks the spatial layouts based on a difference or a distance between the text importance vector and each of the respective feature vectors. In implementations, the metric used to determine a difference between the text importance vector and a feature vector can be based on any number of functions, such as based on an angle between the two vectors, based on a Euclidean distance between the vectors, an average comparison, and/or based on any other type of comparison algorithm. The spatial layouts of the text phrase can then be displayed, such as in a user interface, and the spatial layouts are prioritized according to the ranking of the spatial layouts.

The described techniques for text importance spatial layout provide for quantitatively measuring a degree of similarity of a text spatial layout matching user-designated design criteria, such as the semantic importance of the words in a text phrase and/or the geometric properties of conforming to a bounding box. The described techniques also accommodate a multi-objective optimization problem, where it can be difficult for a designer to manually balance between several user-specified design constraints. In particular, the generation of multiple text spatial layouts accounts for the geometric constraints that designers encounter with graphics design work, and additionally, accounts for the user-specified style and text emphasis criteria.

Notably, the described techniques for text importance spatial layout utilize text emphasis as a design criteria to generate and evaluate multiple text spatial layouts, without a user having to manually edit other design attributes. Additionally, the generated text spatial layouts can be evaluated and ranked for how closely each spatial layout matches to the design criteria designated by the user. Further, the described techniques provide the flexibility to represent the text spatial layouts as feature vectors that can be compared and optimized utilizing a variety of optimization techniques. It should be noted that this approach can also be extended to non-textual design implementations, such as to automatically generate graphics image layouts that may include a combination of images and text.

While features and concepts of text importance spatial layout can be implemented in any number of different devices, systems, networks, environments, and/or configurations, implementations of text importance spatial layout are described in the context of the following example devices, systems, and methods.

FIG. 1 illustrates an example 100 of a computing device 102 that can implement aspects of the techniques for text importance spatial layout, as described herein. The computing device 102 implements features of a text layout manager 104 designed to utilize text emphasis of words in a text phrase as a design criteria to generate multiple text spatial layouts, and evaluate the spatial layouts for how closely each one matches to design criteria designated by a user of the device. In this example, the computing device 102 may be any type of consumer electronic device, computing device, client device, tablet device, mobile device, wireless device, and/or any other type of electronic, computing, and/or communication device. The computing device 102 can also be implemented with various components, such as any number and combination of different components as further described with reference to the example device shown in FIG. 6. Generally, the computing device 102 includes a memory 106 and a processor 108, as well as a display device 110 on which digital images and text content can be displayed in application user interfaces.

In this example 100, the computing device 102 includes an image editing application 112, which a designer (e.g., a user of the device) may use to graphically edit, design, and/or enhance digital images and text content, such as may be displayed in a user interface 114 of the image editing application 112 on the display device 110 of the computing device. The image editing application 112 is an example of any type of a computer-based image editing and graphics design software application that a designer may use to edit and design graphics and text spatial layouts.

The computing device 102 implements the text layout manager 104, which can be implemented as one or more modules that may include independent processing, memory, and/or logic components functioning as a computing and/or electronic device integrated with the computing device. Alternatively or in addition, the text layout manager 104 can be implemented in software, in hardware, or as a combination of software and hardware components. In this example 100, the text layout manager 104 is integrated with the image editing application 112, and is implemented as components or modules of a software application, such as executable software instructions (e.g., computer-executable instructions) that are executable with a processing system (e.g., the processor 108, a graphics processor, and the like) of the computing device 102 to implement aspects of the described techniques for text importance spatial layout.

As components or modules of a software application, the text layout manager 104 can be stored in memory of the device (e.g., in the device memory 106), or in any other suitable memory device or electronic data storage implemented with the text layout manager. Alternatively or in addition, the text layout manager 104 may be implemented in firmware and/or at least partially in computer hardware. For example, at least part of the text layout manager 104 may be executable by a computer processor, and/or at least part of the text layout manager may be implemented in logic circuitry.

In implementations, a user may enter a text phrase 116 as a text input, such as in the user interface 114, an example of which is further shown and described with reference to FIG. 3. In a simple example, a user of the computing device 102 may provide the text phrase 116 as a text input of "small dog barks." For a design project, the user may want to emphasize the constituent words 118 of the text phrase, "small", "dog", and "barks" differently. For example, the words can be emphasized differently, both when spoken and when displayed, such as "small DOG barks", "SMALL dog barks", "SMALL dog BARKS", "small dog BARKS", and/or in many other emphasis variations and layout configurations. Generally, emphasis in speech can be analogous in a visual presentation as to how someone might emphasize the importance and nuances of particular words, and a display of larger, more colorful, and/or stylized words connotes that emphasis. While this is a simple text input example of only a three-word text phrase, one can appreciate how a text phrase with even a few words can quickly expand to near infinite possible combinations of word size, word spacing, and overall layout, particularly when also taking into account word height, rotation, area, diagonal, scale, color, style, and/or the many other possible text features that may be used to emphasize text in a visual layout.

The text layout manager can then receive a text importance vector 120 that includes vector elements 122 as designations of visual properties 124 for the constituent words 118 of the text phrase 116. The visual properties 124 for the constituent words 118 of the text phrase can include a text size, a font style, a color of the constituent words, or any other type of visual property. The text layout manager 104 can modify the visual properties 124 for each of the constituent words 118 to reflect a relative weight of a constituent word in the text importance vector 120 as a representation of a semantic importance of the constituent word in a spatial layout of the text phrase. The text layout manager can also receive a bounding box designation 126 as an input, and an aspect ratio of the bounding box defines a suggested rectilinear constraint on a layout of the constituent words 118 of the text phrase. In implementations, the text layout manager 104 may also receive one or more additional spatial layout inputs 128, such as any type of a word or text attribute used to create emphasis variations and spatial layouts of the text phrase.

The text layout manager 104 can then determine the spatial layouts 130 of the text phrase 116, where each spatial layout 130 is a different displayable representation of the constituent words 118 arranged, such as shown in the user interface 114 in the display device 110 of the computing device 102. In this example, the spatial layouts 130 are each determined as a packed rectangular text layout, which is a visual arrangement of the constituent words 118 having different text sizes in a layout that fills a rectangular area as defined by a bounding box, and the white space delineating the boundaries between the words is kept to a minimum. It should also be noted that, although the text spatial layouts described herein and shown in the figures are generally packed rectangular text layouts, the described techniques may be applied for any layout style in which words can have different emphasis, such as based on various visual properties that may include a text size, a font style, a text color, or any other type of visual property.

Each of the spatial layouts 130 is determined by the text layout manager 104 based in part on the visual properties 124 designated in the text importance vector 120 for each of the constituent words 118. The text layout manager 104 is implemented to optimize multiple objectives to determine a spatial layout 130, where multiple objectives may include a semantic importance of the constituent words 118 reflected in a spatial layout, and the spatial layout of the text phrase 116 conforms to an aspect ratio of the bounding box. Accordingly, one or more of the spatial layouts 130 are determined by the text layout manager 104 with the constituent words 118 of the text phrase conformed within an aspect ratio of the bounding box.

In implementations, the text layout manager 104 can determine the spatial layouts 130 of the text phrase 116 based on the bounding box and optimized based on a semantic importance of the constituent words 118 as designated by the visual properties 124 in the text importance vector 120. For example, the text layout manager 104 can deviate from the bounding box in favor of maintaining a spatial layout of the text phrase based on the semantic emphasis of the constituent words 118 in the text phrase 116. Alternatively, the text layout manager 104 can give more weight to maintaining the aspect ratio of the bounding box over the semantic emphasis of the constituent words 118 in the spatial layout 130 of the text phrase 116, such as when a designer is limited to a specific copy space associated with geometric restrictions or regions in a design project.

Generally, the visual properties 124 for each of the constituent words 118 may be user-designated design criteria so that the user can emphasize one or more of the constituent words over others in the various spatial layout configurations. Alternatively or in addition, a machine learning model or natural language processing model may be implemented as a component of the text layout manager 104 to weight the constituent words 118 of the text phrase 116 for importance, as designated in the text importance vector 120. In other implementations, the spatial layouts 130 can be generated randomly and scaled to the rectilinear constraints of the bounding box utilizing a binary tree structure implemented as a layout system of the text layout manager 104. The binary tree structure provides data representation and text weighting for laying out the constituent words 118 of the text phrase 116 in the various spatial layouts 130.

The text layout manager 104 can represent the text phrase 116 as a sequence of text objects having properties, which can include an order of the text objects, a number of the text objects, weights of the text objects, runs of consecutive text objects having a same weight, and so forth. The text layout manager 104 can assign weights to the text objects to represent a relative importance of the individual constituent words 118 within the sequence of text objects, where a greater weight corresponds to a greater relative importance of a word. Alternatively or in addition, weights can be assigned to the text objects based on styles of the constituent words 118 as described by the text input. Accordingly, text objects that represent the constituent words 118 having different styles of text may be assigned different weights corresponding to the different styles of the text. Further, weights can be assigned to the text objects based on a substance or a semantics of the constituent words 118 in a text sequence that represents the text phrase 116, such as to account for words having a particular meaning or context.

In implementations, the text layout manager 104 may access layout data or templates to determine the spatial layouts 130, and/or generate the spatial layouts 130 based on the various inputs, such as the text phrase 116, the bounding box designation 126, and any of the other spatial layout inputs 128. The text layout manager 104 can generate a binary tree representation of a spatial layout 130, where the binary tree has leaf nodes that represent the constituent words 118 and parent nodes that define relative alignment or orientations of the words. Any of the nodes of the binary tree can be modified with a rotation and/or a scale transformation to rotate and/or scale the words represented by the nodes. The text layout manager 104 can utilize the binary tree to generate an arrangement of the text objects into a spatial layout 130, which is generated automatically and without user intervention beyond the inputs to the system.

The text layout manager 104 is also implemented to generate feature vectors 132 that each represent a spatial layout 130 of the text phrase 116, and the feature vectors represent one or more properties of a spatial layout, representing the visual relevance of each variation of the spatial layouts 130. A feature vector 132 has vector elements 134 which include measurement properties 136 of each of the constituent words 118 in a respective spatial layout 130. In implementations, a spatial layout 130 can be represented by multiple feature vectors 132, each representing a different objective for the constituent words 118 of the text phrase 116. A measurement property 136 of a constituent word 118 in a feature vector 132 designates a displayable feature of the constituent word, such as word height, rotation, area, diagonal, scale, color, style, and/or the many other possible text features that may be used to emphasize text in a visual layout.

For example, the visual properties 124 for each of the constituent words 118 in the text importance vector 120 may indicate "height" as the word feature on which to base determining the spatial layouts 130. Accordingly, the measurement properties 136 of a feature vector 132 indicate the height of each word, as they fit into a particular spatial layout 130 and within the constraints of the bounding box. Similarly, the measurement properties 136 of a feature vector 132 may indicate the area of each constituent word 118 as it fits into a particular spatial layout 130, or the diagonal length of each constituent word as it fits into a particular spatial layout. Additionally, multiple feature vectors 132 can represent one of the spatial layouts 130, and the metric used to rank the spatial layouts 130 is based on a difference between the text importance vector 120 and the multiple feature vectors. For example, the text layout manager 104 can prioritize a set of the spatial layouts 130 based on the similarity of each of the respective feature vectors 132 to the user-defined visual properties 124 designated in the text importance vector 120 by way of multi-objective optimization, such as determined from a weighted sum of Euclidean distances.

The text layout manager 104 can rank the spatial layouts 130 based on a metric that indicates a degree of similarity (e.g., how well) the measurement properties 136 of each of the constituent words 118 in a respective spatial layout 130 match to the visual properties 124 for the constituent words 118, as designated in the text importance vector 120. In implementations, the text layout manager 104 ranks the spatial layouts 130 based on a difference between the text importance vector 120 and each of the respective feature vectors 132.

In implementations, the metric used to determine a difference between the text importance vector 120 and a feature vector 132 can be based on any number of functions, such as based on an angle between the two vectors, based on a Euclidean distance between the vectors, an average comparison, and/or based on any other type of comparison algorithm. For example, the spatial layouts ranking 138 first indicates the spatial layout 130 with the lowest Euclidean distance between the text importance vector 120 and a respective feature vector 132, and so on. The spatial layouts 130 of the text phrase 116 can then be displayed, such as shown in the user interface 114 in the display device 110 of the computing device 102, and the spatial layouts 130 are prioritized according to the ranking 138 of the spatial layouts.

Figure 2:
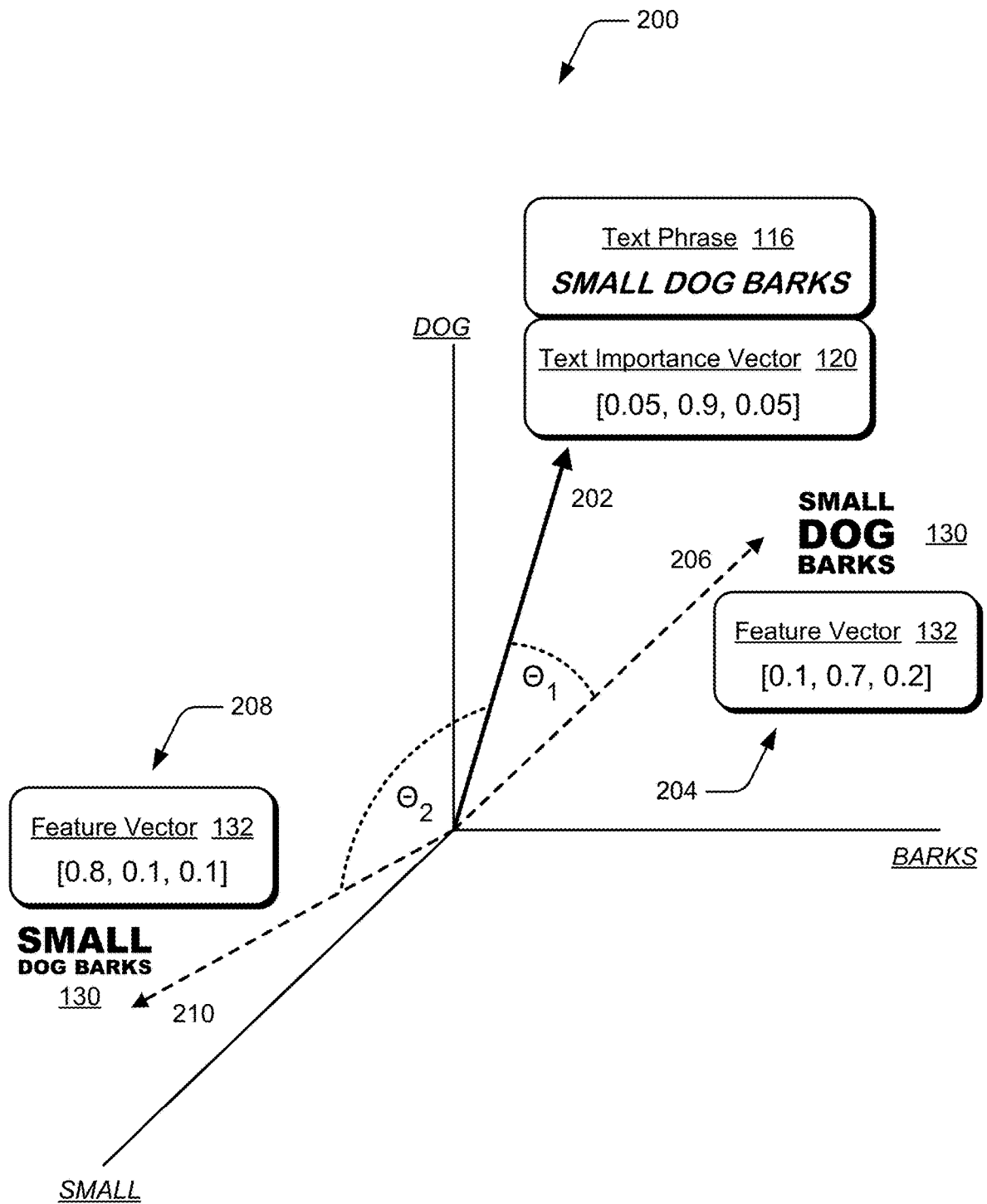
FIG. 2 further illustrates an example of the techniques for text importance spatial layout implemented by the text layout manager, as described herein.

FIG. 2 further illustrates an example 200 of the techniques for text importance spatial layout implemented by the text layout manager 104, as shown and described with reference to FIG. 1. For example, the text importance vector 120 is shown as a vector 202 in n-dimensional space, where each dimension (e.g., vector element 122) is a designation of a visual property 124 for a constituent word 118 of the example text phrase 116 "small dog barks." The visual properties 124 for each of the constituent words designated in the text importance vector 120 are the dimension values that denote the relative importance of a respective constituent word. In this example 200, the dimension values each indicate a user-designated height of each respective constituent word 118 in the text phrase, such as "small" 0.05, "dog" 0.9, and "barks" 0.05 in the text importance vector 120.

The text layout manager 104 determines the spatial layouts 130 of the text phrase 116, where each spatial layout 130 is a different displayable representation of the constituent words 118 spatially arranged. The text layout manager 104 also generates the feature vectors 132 that each represent a respective spatial layout 130 of the text phrase 116. In this example 200, the feature vectors 132 are generated with the vector elements 134 that are the measurement properties 136 as a measure of the height of the respective constituent words 118 in each spatial layout. For example, the feature vector 132 shown at 204 is a three-element feature vector that represents the spatial layout 130 of "small DOG barks", as indicated by the dotted line vector 206. Similarly, the feature vector 132 shown at 208 is a three-element feature vector that represents the spatial layout 130 of "SMALL dog barks", as indicated by the dotted line vector 210. The feature vectors 132 encode the measurement properties 136 from the respective spatial layouts 130, and represent the one or more measurement properties of a spatial layout.

The text layout manager 104 can then quantitatively measure how closely a spatial layout 130 matches or compares to the text importance vector 120 of the user-specified inputs. In implementations, the text layout manager 104 can determine the difference between the text importance vector 120 and each of the feature vectors 132 that correspond to the respective spatial layouts 130. In this example 200, the text layout manager 104 is shown to calculate the angles theta between the respective vectors as an indication of how closely one spatial layout or another matches or compares to the text importance vector 120. Notably, the angle theta one ($\Theta_1$) is smaller than theta two ($\Theta_2$), which indicates that the spatial layout 130 shown at 204 and corresponding to the vector 206 is a better representation, or more closely matches the text importance vector 120, than the spatial layout 130 shown at 208 and corresponding to the vector 210. This correlates with the expected determination, given that "dog" 0.9 in the text importance vector 120 indicates the word "dog" is larger than the other words "small" and "barks", and the spatial layout 130 shown at 204 and corresponding to the vector 206 is the closer representation of the user-designated criteria (e.g., the visual properties 124 in the text importance vector).

The text layout manager 104 can quantitatively rank all of the determined spatial layouts 130 to determine how closely they each correspond to the text importance vector 120. Notably, these techniques for text importance spatial layout can be extended to include multiple features, compared to multiple objectives, where each objective will have its own dimension. For example, the aspect ratio of the bounding box is an objective that may have only one value, which can then be compared to a single value representing the aspect ratio of a determined spatial layout 130. Accordingly, these multiple objectives and the measured differences from the user-designated layout can be combined as a multi-objective optimization to rank and determine how well a spatial layout matches the objective. Further, the objectives may be combined and evaluated by the text layout manager 104 in any number of ways, such as by summation with weighted terms, by multiplication, etc.

Figure 3:
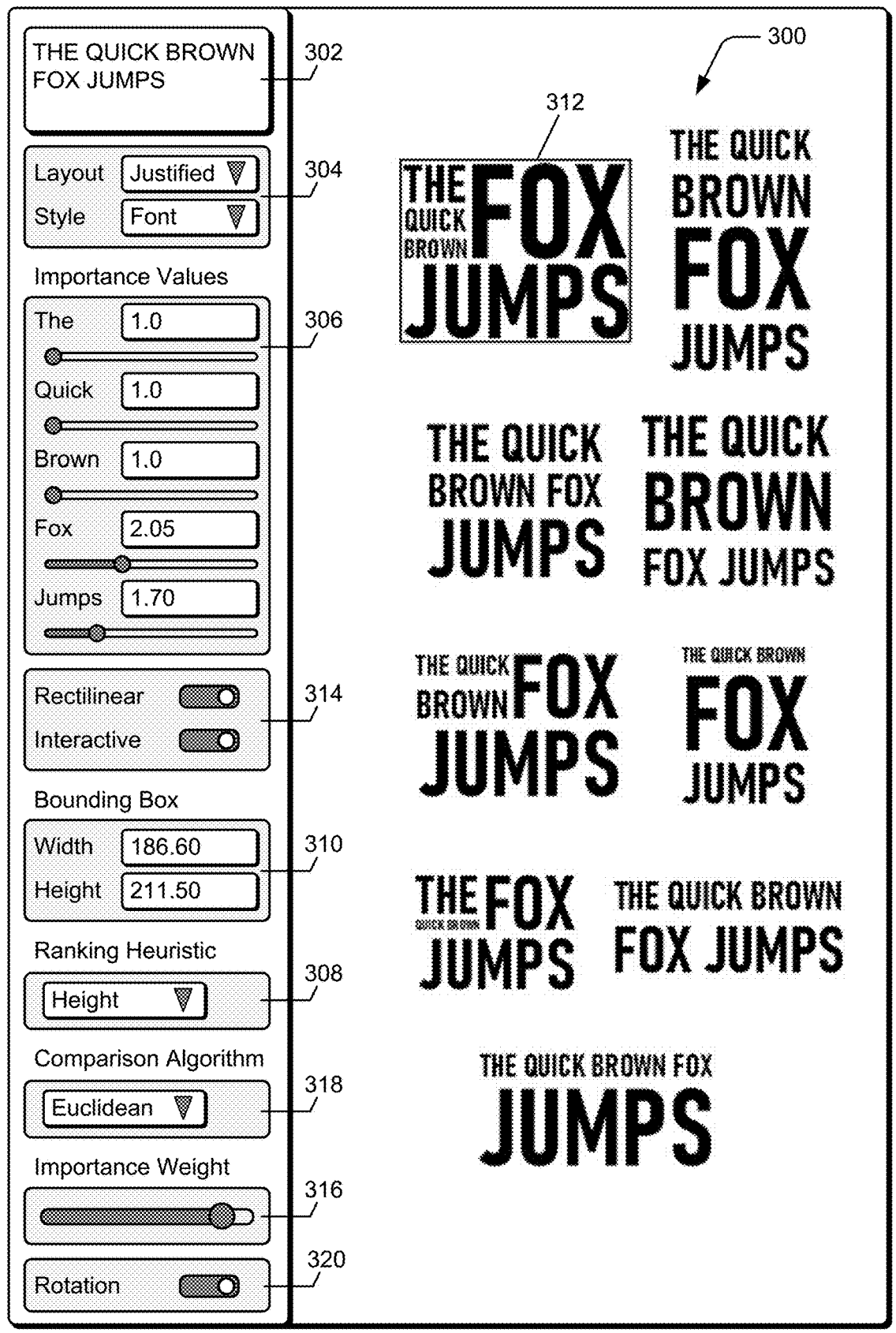
FIG. 3 further illustrates an example of a user interface and features for text importance spatial layout implemented by the text layout manager, as described herein.

FIG. 3 further illustrates an example user interface 300 and features for text importance spatial layout, such as implemented by the text layout manager 104, as shown and described with reference to FIGS. 1 and 2. The user interface 300 is an example of the user interface 114 shown displayed on the display device 110 of the computing device 102, and may be generated by the text layout manager 104 and/or by an image editing application 112. In this example, the user interface 300 has a text entry region 302 in which a user can enter the text phrase 116 as the text input, which is then received by the text layout manager 104 as the text importance vector. In this example, a user of the computing device 102 may provide the text phrase 116 as a text input of "the quick brown fox jumps." A user may also set the type of layout and font style of the text input at 304. Notably, as the user enters the text phrase 116 in the text entry region 302 of the user interface, the spatial layouts 130 are determined and dynamically updated by the text layout manager 104, and displayed in the user interface. In this example, several variations of the spatial layouts 130 are displayed based on the other user-designated criteria entered in the user interface.

The user interface 300 includes a region of importance values 306, which correlate with the user-designated visual properties 124 for each of the constituent words 118 of the text phrase 116, as the vector elements 122 of the text importance vector 120. Generally, the visual properties 124 for each of the constituent words 118 are the user-designated design criteria, which the user can set to emphasize one or more of the constituent words over others in the various spatial layout configurations. In this example, the user can designate the importance values 306 by any type of computer input device to enter the values and/or by manipulating a respective slider function for each of the constituent words 118 of the entered text phrase.

As shown in this example, the design criteria indicates a user desires that the word "fox" (having a value of 2.05) will be larger than the word "jumps" (having a lesser value of 1.70), and both of these words will be larger than the equally weighted words "the", "quick", and "brown" (all having the value of 1.0). For the selected ranking heuristic 308 of "height", the importance values 306 each indicate a user-designated height of each respective constituent word 118 in the text phrase, such as "the" 1.0, "quick" 1.0, "brown" 1.0, "fox" 2.05, and "jumps" 1.7 in the text importance vector 120. In implementations, the ranking heuristic 308 may be user selectable as height, width, area, scale, diagonal length, color, and/or any of the many other possible text features that may be used to emphasize text in a visual layout.

A user of the computing device 102 can also enter the bounding box designation 126 as width and height parameters 310 of the bounding box 312. A user can enter the width and height parameters 310 of the bounding box 312 in the user interface 300 by any type of computer input device used to enter the values. Alternatively or in addition, the user can select-and-drag a portion of the bounding box 312 in the user interface display on the display device, and the width and height parameters 310 of the bounding box automatically update accordingly. The user can also initiate other display features 314, such as a rectilinear toggle and an interactive toggle. When toggled-on, the interactive feature provides that the text layout manager 104 dynamically updates the spatial layouts 130 displayed in the user interface as the user enters and/or changes the design criteria via user inputs in the user interface. The rectilinear feature provides that the text layout manager 104 generates the spatial layouts 130 with the words of the entered text phrase filling-out and conformed within the bounding box 312, such as shown in this example on the user interface.

The user interface 300 also includes a user-selectable slider to designate the importance weight 316 of the semantic emphasis of the constituent words 118 of the input text phrase. As noted above, the text layout manager 104 can deviate from the aspect ratio of the bounding box (e.g., as established by the width and height parameters 310) to maintain a spatial layout 130 of the text phrase 116, giving more weight to the semantic emphasis of the constituent words 118 in the text phrase. Alternatively, the text layout manager 104 can give more weight to maintaining the aspect ratio of the bounding box 312 over the semantic emphasis of the constituent words 118 in the spatial layout 130 of the text phrase 116.

The user interface 300 also includes a designation for the comparison algorithm 318 utilized by the text layout manager 104 to rank the spatial layouts 130, such as based on a difference or a distance between the text importance vector 120 and each of the respective feature vectors 132. In implementations, the comparison algorithm 318 may be user selectable as Euclidean distance, an average, a hill function, a curve function, and/or as any other type of comparison algorithm utilized by the text layout manager 104 to rank the spatial layouts of the words of the input text phrase. In other implementations, a user may also initiate to rotate one or more of the words of the input text phrase by selecting a rotation toggle 320. The text layout manager 104 can then rotate one or more of the constituent words 118 when determining a spatial layout 130 and conforming to the bounding box.

Example methods 400 and 500 are described with reference to respective FIGS. 4 and 5 in accordance with one or more aspects of text importance spatial layout. Generally, any of the components, modules, methods, and operations described herein can be implemented using software, firmware, hardware (e.g., fixed logic circuitry), a processing device, manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
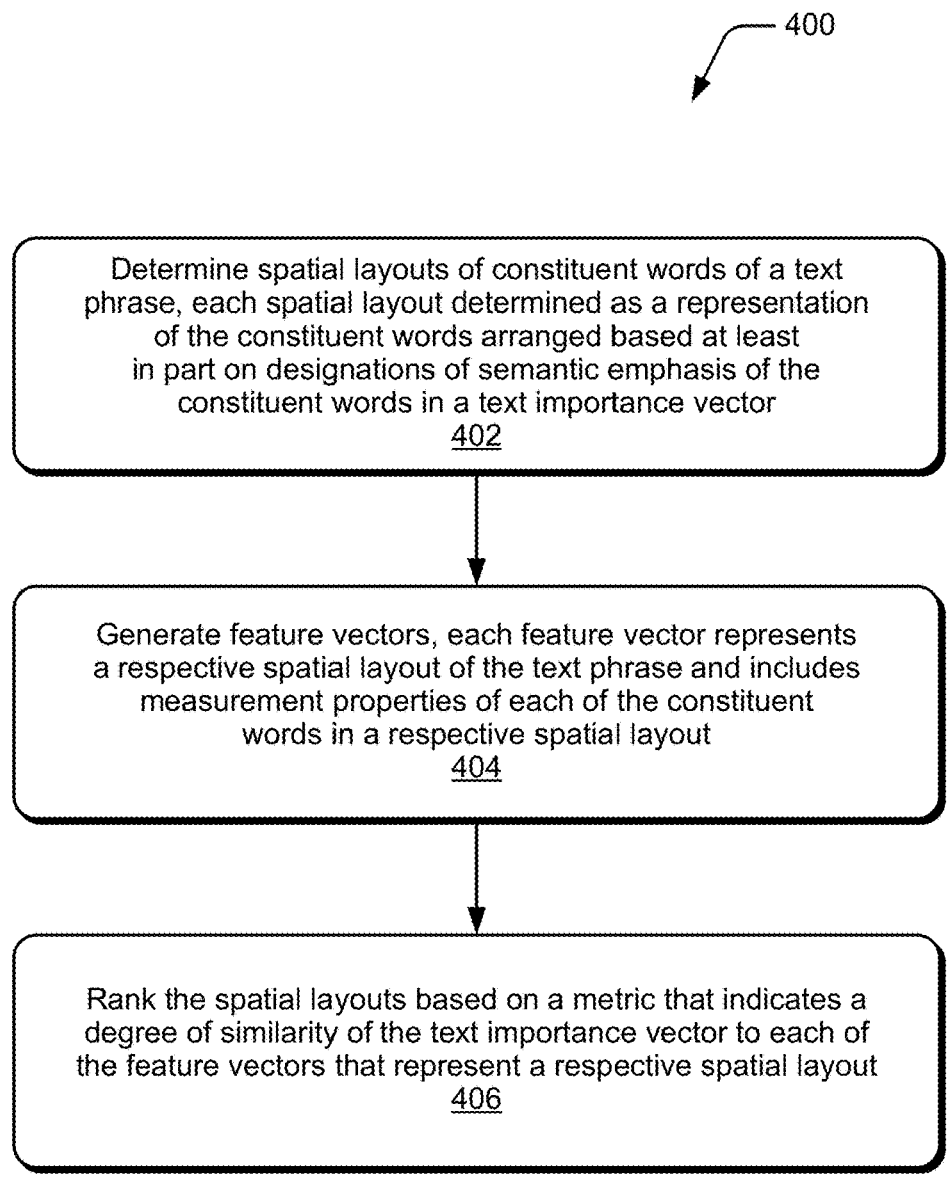
FIG. 4 illustrates example methods of text importance spatial layout in accordance with one or more implementations.

FIG. 4 illustrates example method(s) 400 for text importance spatial layout, and is generally described with reference to the text layout manager implemented by a computing device (e.g., processing device) as shown and described with reference to FIGS. 1-3. The order in which the method is described is not intended to be construed as a limitation, and any number or combination of the method operations can be combined in any order to implement a method, or an alternate method.

At 402, spatial layouts of constituent words of a text phrase are determined, each spatial layout determined as a representation of the constituent words arranged based at least in part on designations of semantic emphasis of the constituent words in a text importance vector. For example, the text layout manager 104 implemented by the computing device 102 determines the spatial layouts 130 of the constituent words 118 of the text phrase 116, and each spatial layout 130 is determined as a representation of the constituent words arranged based at least in part on the designations of semantic emphasis of the constituent words in the text importance vector 120. Additionally, the text layout manager 104 determines one or more of the spatial layouts 130 with the constituent words 118 of the text phrase 116 conformed within an aspect ratio of the bounding box, which is received by the text layout manager as an input of the bounding box designation 126.

At 404, feature vectors that each represent a respective spatial layout of the text phrase are generated, and each feature vector includes measurement properties of each of the constituent words in a respective spatial layout. For example, the text layout manager 104 generates the multiple feature vectors 132, where each feature vector represents a respective spatial layout 130 of the text phrase 116, and includes the measurement properties 136 of each of the constituent words 118 in the respective spatial layout.

At 406, the spatial layouts are ranked based on a metric that indicates a degree of similarity of the text importance vector to each of the feature vectors that represent a respective spatial layout. For example, the text layout manager 104 ranks the spatial layouts 130 based on a metric that indicates a degree of similarity (e.g., how similar) the text importance vector 120 is to each of the feature vectors 132 that represent a respective spatial layout. The text layout manager 104 can rank the spatial layouts 130 based on a difference between the text importance vector 120 and each of the respective feature vectors 132. In implementations, the metric used to determine a difference or a distance between the text importance vector 120 and a feature vector 132 can be based on any number of functions, such as based on an angle between the two vectors, based on a Euclidean distance between the vectors, an average comparison, and/or based on any other type of comparison algorithm.

Figure 5:
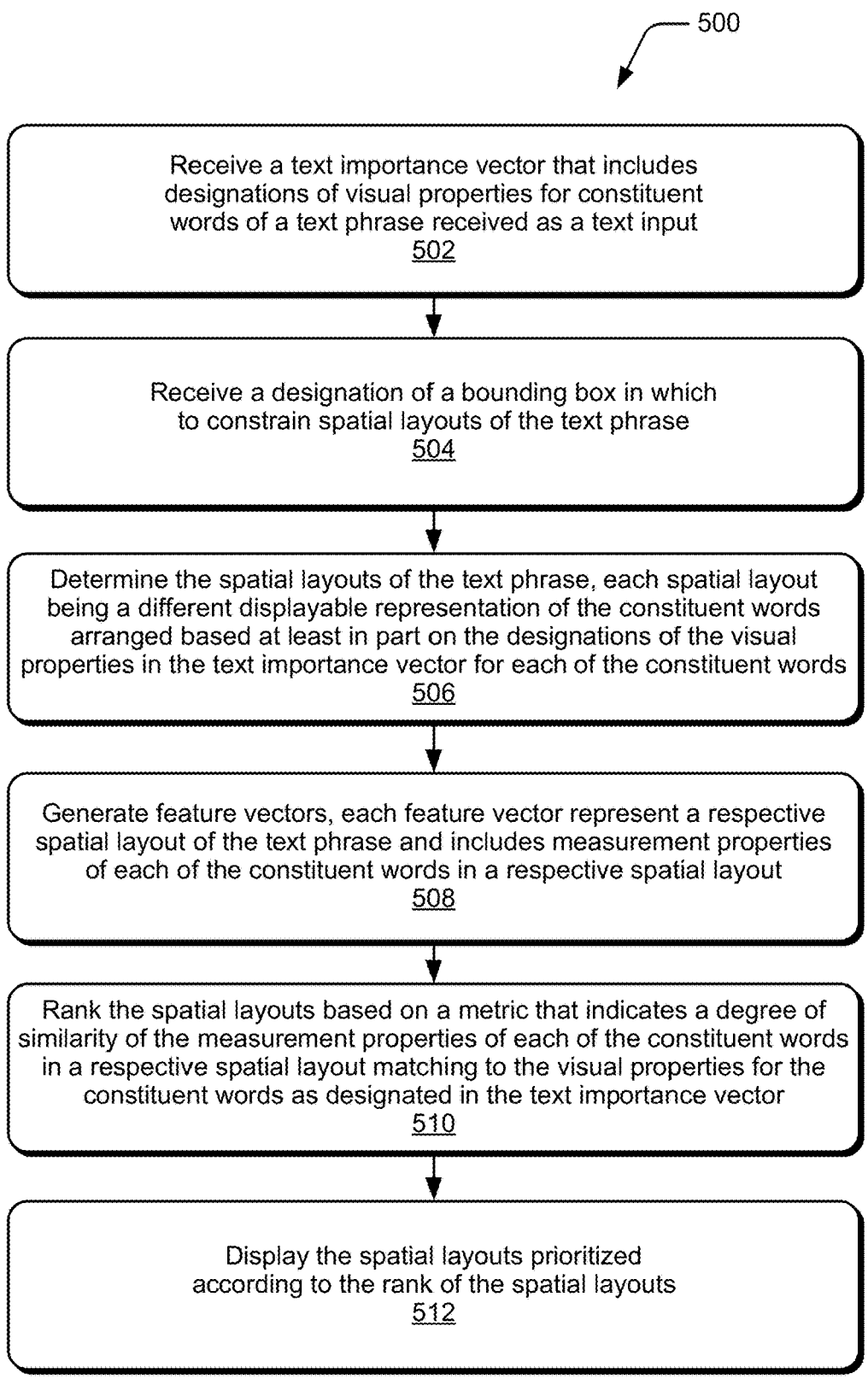
FIG. 5 illustrates example methods of text importance spatial layout in accordance with one or more implementations.

FIG. 5 illustrates example method(s) 500 for text importance spatial layout, and is generally described with reference to the text layout manager implemented by a computing device (e.g., processing device) as shown and described with reference to FIGS. 1-3. The order in which the method is described is not intended to be construed as a limitation, and any number or combination of the method operations can be combined in any order to implement a method, or an alternate method.

At 502, a text importance vector is received, and the text importance vector includes designations of visual properties for constituent words of a text phrase received as a text input. For example, the text layout manager 104 receives the text importance vector 120 that includes elements 122 as designations of the visual properties 124 for the constituent words of the text phrase, which may be received as a text input in the user interface. The visual properties 124 for the constituent words 118 of the text phrase 116 can be importance weighted in the text importance vector 120 for semantic emphasis of the constituent words.

At 504, a designation of a bounding box in which to constrain spatial layouts of the text phrase is received. For example, the text layout manager 104 receives the bounding box designation 126 as an input, and an aspect ratio of the bounding box defines a suggested rectilinear constraint on a spatial layout 130 of the constituent words 118 of the text phrase. The text layout manager 104 may also receive one or more additional spatial layout inputs 128, such as any type of a word or text attribute used to create emphasis variations and the spatial layouts 130 of the text phrase.

At 506, the spatial layouts of the text phrase are determined, where each spatial layout is a different displayable representation of the constituent words arranged based at least in part on the designations of the visual properties in the text importance vector for each of the constituent words. For example, the text layout manager 104 determines the spatial layouts 130 of the text phrase 116, where each spatial layout 130 is a different displayable representation of the constituent words 118 arranged, such as shown in the user interface 114 in the display device 110 of the computing device 102. Each of the spatial layouts 130 is determined by the text layout manager 104 based in part on the visual properties 124 in the text importance vector 120 for each of the constituent words 118, as designated in the text importance vector 120. The text layout manager can optimize multiple objectives to determine a spatial layout 130, where the multiple objectives include a semantic importance of the constituent words 118 reflected in a spatial layout, and the spatial layout of the text phrase conforms to an aspect ratio of the bounding box. Accordingly, one or more of the spatial layouts 130 are determined by the text layout manager 104 with the constituent words 118 of the text phrase conformed within an aspect ratio of the bounding box.

Additionally, the text layout manager 104 can determine the spatial layouts 130 of the text phrase 116 based on the bounding box and optimized based on a semantic importance of the constituent words 118 as designated by the visual properties 124 in the text importance vector 120. For example, the text layout manager 104 can deviate from the bounding box in favor of maintaining a spatial layout 130 of the text phrase 116 based on the semantic emphasis of the constituent words 118 in the text phrase. Alternatively, the text layout manager 104 can give more weight to maintaining the aspect ratio of the bounding box over the semantic emphasis of the constituent words 118 in the spatial layout 130 of the text phrase, such as when a designer is limited to a specific copy space associated with geometric restrictions or regions in a design project.

At 508, feature vectors that each represent a respective spatial layout of the text phrase are generated, and each feature vector includes measurement properties of each of the constituent words in a respective spatial layout. For example, the text layout manager 104 generates the multiple feature vectors 132, where each feature vector represents a respective spatial layout 130 of the text phrase 116, and includes the measurement properties 136 of each of the constituent words 118 in the respective spatial layout 130. The measurement properties 136 of the constituent words 118 in a feature vector 132 each designate a displayable feature of a respective constituent word, such as word height, rotation, area, diagonal, scale, color, style, and/or the many other possible text features that may be used to emphasize text in a visual layout. A spatial layout 130 can be defined by multiple feature vectors 132, where each feature vector represents a different objective used to determine the spatial layout, and the text layout manager 104 is implemented to optimize the multiple, different objectives to determine the spatial layout based on relative weights of the multiple, different objectives.

At 510, the spatial layouts are ranked based on a metric that indicates a degree of similarity of the measurement properties of each of the constituent words in a respective spatial layout matching to the visual properties for the constituent words as designated in the text importance vector. For example, the text layout manager 104 ranks the spatial layouts 130 based on a metric that indicates a degree of similarity of the measurement properties 136 of each of the constituent words 118 in a respective spatial layout 130 matching to the visual properties 124 for the constituent words 118, as designated in the text importance vector 120. The text layout manager 104 utilizes a metric to rank the spatial layouts 130, such as based on a difference between the text importance vector 120 and each of the respective feature vectors 132, where the spatial layouts 130 are ranked based on how well normalized visual properties match to the normalized importance values. In implementations, the metric used to determine a difference or a distance between the text importance vector 120 and a feature vector 132 can be based on any number of functions, such as based on an angle between the two vectors, based on a Euclidean distance between the vectors, an average comparison, and/or based on any other type of comparison algorithm.

At 512, the spatial layouts are displayed, prioritized according to the rank of the spatial layouts. For example, the spatial layouts 130 of the text phrase 116 are then displayed, such as shown in the user interface 114 in the display device 110 of the computing device 102, and the spatial layouts 130 are prioritized according to the ranking 138 of the spatial layouts.

Figure 6:
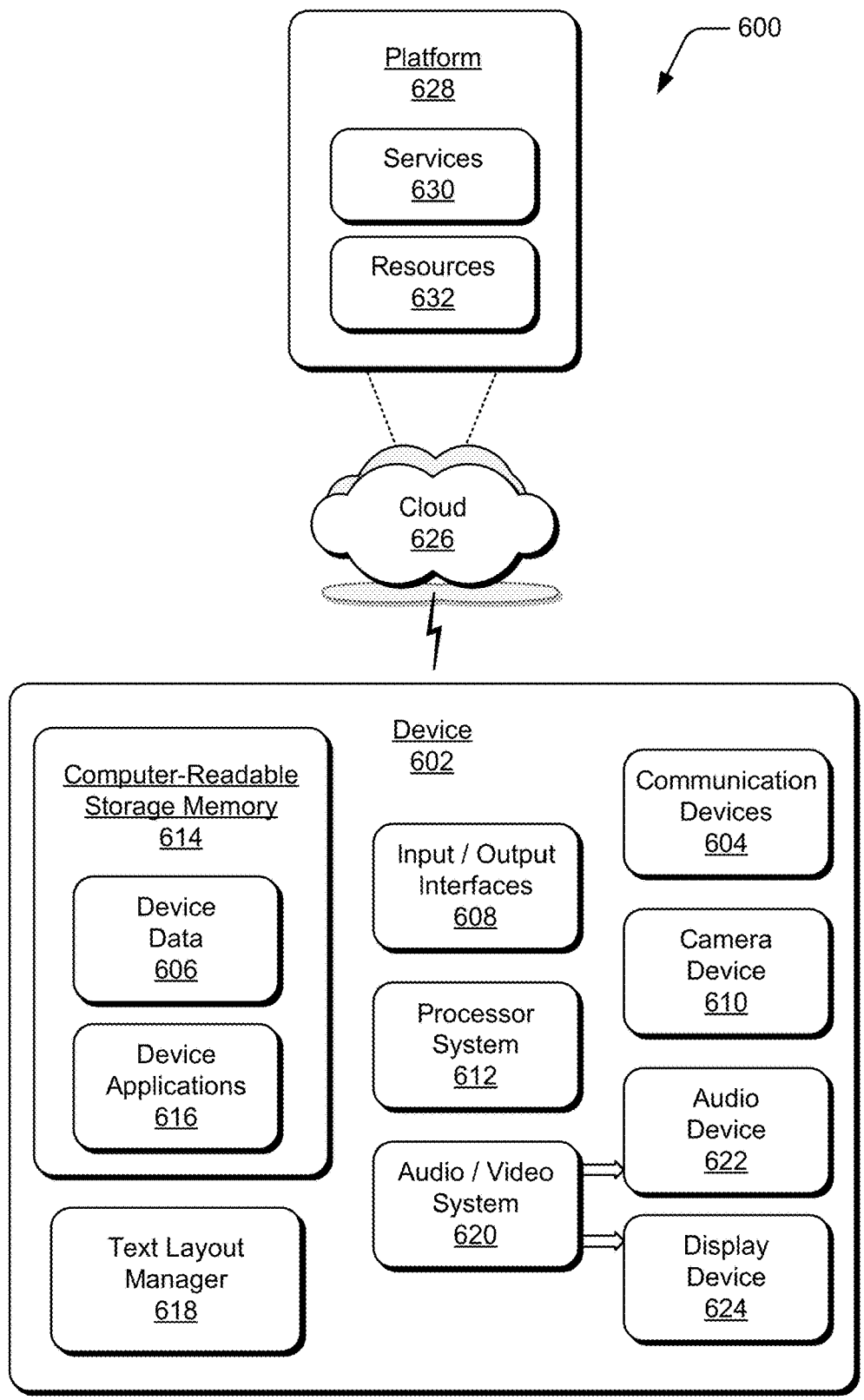
FIG. 6 illustrates an example system with an example device that can implement aspects of the techniques for text importance spatial layout.

FIG. 6 illustrates an example system 600 that includes an example device 602, which can implement techniques of text importance spatial layout. The example device 602 can be implemented as any of the computing devices, mobile devices, server devices, and/or services described with reference to the previous FIGS. 1-5, such as any type of computing device, client device, mobile phone, tablet, communication, entertainment, gaming, media playback, and/or other type of device. For example, the text layout manager 104 can be implemented by the example device 602.

The example device 602 includes communication devices 604 that enable wired and/or wireless communication of device data 606, such as any of the text content, vector element values, and/or any other text layout data, as well as computer applications data and content that is transferred from one computing device to another, and/or synched between multiple computing devices. The device data 606 can include any type of audio, video, image, and/or graphics data that is received and/or generated by applications executing on the device. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device 610 and/or any other type computer input device that may be integrated with the example device 602. The I/O interfaces also include data input ports via which any type of data, content, and/or inputs can be received, such as user inputs to the device, as well as any type of audio, video, and/or image data received from any content and/or data source.

The device 602 includes a processor system 612 that may be implemented at least partially in hardware, such as with any type of one or more microprocessors, controllers, and the like that process executable instructions. The processor system 612 can include components of an integrated circuit, a programmable logic device, a logic device formed using one or more semiconductors, and other implementations in silicon and/or hardware, such as a processor and memory system implemented as a system-on-chip (SoC). Alternatively or in addition, the device 602 can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The example device 602 also includes computer-readable storage memory 614, such as data storage devices or components implemented in hardware that can be accessed by a computing device, and that provide persistent storage of data and executable instructions (e.g., software applications, modules, programs, functions, and the like). The computer-readable storage memory described herein excludes propagating signals. The computer-readable storage memory can be one or more non-transitory computer-readable media storing a plurality of executable instructions, which when executed by one or more processors, cause the one or more processors to perform operations. Examples of computer-readable storage memory include volatile memory and non-volatile memory, fixed and removable media devices, and any suitable memory device or electronic data storage that maintains data for computing device access. The computer-readable storage memory 614 can include various implementations of random access memory (RAM), read-only memory (ROM), flash memory, and other types of storage memory in various memory device configurations.

The computer-readable storage memory 614 provides storage of the device data 606 and various device applications 616, such as an operating system that is maintained as a software application with the computer-readable storage memory and executed by the processor system 612. In this example, the device 602 includes a text layout manager 618 that implements the described techniques of text importance spatial layout. The text layout manager 618 may be implemented with hardware components and/or in software as one of the device applications 616, such as when the text layout manager is implemented by the example device 602. An example of the text layout manager 618 includes the text layout manager 104, which can be implemented with various components, such as models, systems, algorithms, and/or networks. In implementations, the text layout manager 618 may include independent processing, memory, and logic components as a computing and/or electronic device integrated with the device 602.

In implementations, the text layout manager 618 and/or any of the components of the text layout manager can be implemented as any type of machine learning or neural network with trained classifiers, such as in software and/or in hardware in any type of computing device. The machine learning can be implemented by the device 602 as any type of a neural network or machine learning model, referring to a computer representation that can be tuned or trained based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, generic programming, and the like. Thus, a machine-learning model makes high-level abstractions in data by generating data-driven predictions or decisions from the known input data.

The device 602 also includes an audio and/or video system 620 that generates audio data for an audio device 622 and/or generates display data for a display device 624. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device. In embodiments, at least part of the techniques described for text importance spatial layout may be implemented in a distributed system, such as over a "cloud" 626 in a platform 628. The cloud 626 includes and/or is representative of the platform 628 for services 630 and/or resources 632.

The platform 628 abstracts underlying functionality of hardware, such as server devices (e.g., included in the services 630) and/or software resources (e.g., included as the resources 632), and connects the example device 602 with other devices, servers, etc. The resources 632 may also include applications and/or data that can be utilized while computer processing is executed on servers that are remote from the example device 602. Additionally, the services 630 and/or the resources 632 may facilitate subscriber network services, such as over the Internet, a cellular network, or Wi-Fi network. The platform 628 may also serve to abstract and scale resources to service a demand for the resources 632 that are implemented via the platform, such as in an interconnected device embodiment with functionality distributed throughout the system 600. For example, the functionality may be implemented in part at the example device 602 as well as via the platform 628 that abstracts the functionality of the cloud system.

Although implementations of text importance spatial layout have been described in language specific to features and/or methods, the appended claims are not necessarily limited to the specific features or methods described. Rather, the specific features and methods are disclosed as example implementations of text importance spatial layout, and other equivalent features and methods are intended to be within the scope of the appended claims. Further, various different examples are described and it is to be appreciated that each described example can be implemented independently or in connection with one or more other described examples.

The invention claimed is:

1. A computing device implemented for text importance spatial layout, the computing device comprising:
   a memory component;
   a processing device coupled to the memory component, the processing device to:
      receive a text importance vector that includes designations of visual properties for constituent words of a text phrase received as a text input;
      determine spatial layouts of the text phrase, each spatial layout being a different displayable representation of the constituent words arranged based at least in part on the designations of the visual properties in the text importance vector for each of the constituent words;
      generate a plurality of feature vectors, each feature vector of the plurality of feature vectors represents a respective spatial layout of the text phrase and includes measurement properties of each of the constituent words in the respective spatial layout; and
      rank the spatial layouts based on a metric that indicates a degree of similarity of the measurement properties of each of the constituent words in a respective spatial layout matching to the visual properties for the constituent words as designated in the text importance vector.

2. The computing device as recited in claim 1, wherein the visual properties for the constituent words include at least one of a text size, a font style, or a color of the constituent words.

3. The computing device as recited in claim 1, wherein the processing device is configured to optimize multiple objectives to determine a spatial layout, the multiple objectives including at least a semantic importance of the constituent words reflected in a spatial layout, and the spatial layout of the text phrase conforms to an aspect ratio of a bounding box.

4. The computing device as recited in claim 1, wherein the metric to rank the spatial layouts is a difference between the text importance vector and each of the respective plurality of feature vectors.

5. The computing device as recited in claim 1, wherein a spatial layout is defined by multiple feature vectors of the plurality of feature vectors, each of the multiple feature vectors represents a different objective used to determine the spatial layout, and the processing device is configured to optimize the multiple, different objectives to determine the spatial layout based on relative weights of the multiple, different objectives.

6. The computing device as recited in claim 1, wherein the processing device is configured to:
   receive a designation of a bounding box in which to constrain the spatial layouts of the text phrase; and
   determine one or more of the spatial layouts with the constituent words of the text phrase conformed within an aspect ratio of the bounding box.

7. The computing device as recited in claim 6, wherein the processing device is configured to determine the spatial layouts of the text phrase based on the bounding box and optimized based on a semantic importance of the constituent words as designated by the visual properties in the text importance vector.

8. The computing device as recited in claim 6, wherein the processing device is configured to one of:

deviate from the aspect ratio of the bounding box to maintain a spatial layout of the text phrase based on semantic emphasis of the constituent words; or maintain the aspect ratio of the bounding box over the semantic emphasis of the constituent words in the spatial layout of the text phrase.

9. The computing device as recited in claim 1, further comprising a machine learning model configured to weight the constituent words of the text phrase for importance, as designated in the text importance vector.

10. The computing device as recited in claim 1, wherein the processing device is configured to:

modify the visual properties for each of the constituent words to reflect a relative weight of a constituent word in the text importance vector as a representation of a semantic importance of the constituent word in a spatial layout of the text phrase; and initiate a display of the spatial layouts prioritized according to the rank of the spatial layouts.

11. A method implemented by a processing device in a digital medium environment for text importance spatial layout, the method comprising:

receiving a text importance vector that includes designations of visual properties for constituent words of a text phrase;

determining spatial layouts of the text phrase, each spatial layout being a different displayable representation of the constituent words arranged based at least in part on the designations of the visual properties in the text importance vector for each of the constituent words;

generating a plurality of feature vectors, each feature vector of the plurality of feature vectors represents a respective spatial layout of the text phrase and includes measurement properties of each of the constituent words in the respective spatial layout; and ranking the spatial layouts based on a metric that indicates a degree of similarity of the measurement properties of each of the constituent words in a respective spatial layout matching to the visual properties for the constituent words as designated in the text importance vector.

12. The method as recited in claim 11, further comprising:

optimizing multiple objectives to determine a spatial layout, the multiple objectives including at least a semantic importance of the constituent words reflected in a spatial layout, and the spatial layout of the text phrase conforms to an aspect ratio of a bounding box.

13. The method as recited in claim 11, wherein the metric for ranking the spatial layouts is a difference between the text importance vector and each of the respective plurality of feature vectors.

14. The method as recited in claim 11, wherein a spatial layout is defined by multiple feature vectors of the plurality of feature vectors, each of the multiple feature vectors represents a different objective used to determine the spatial layout, and the method further comprising optimizing the multiple, different objectives to determine the spatial layout based on relative weights of the multiple, different objectives.

15. The method as recited in claim 11, further comprising:

receiving a designation of a bounding box in which to constrain the spatial layouts of the text phrase; and determining one or more of the spatial layouts with the constituent words of the text phrase conformed within an aspect ratio of the bounding box and optimized based on a semantic importance of the constituent words.

16. The method as recited in claim 15, further comprising one of:

deviating from the aspect ratio of the bounding box to maintain a spatial layout of the text phrase based on the semantic importance of the constituent words; or maintaining the aspect ratio of the bounding box over the semantic importance of the constituent words in the spatial layout of the text phrase.

17. The method as recited in claim 11, further comprising:
displaying the spatial layouts prioritized according to the rank of the spatial layouts.

18. The method as recited in claim 11, further comprising:
modifying the visual properties for each of the constituent words to reflect a relative weight of a constituent word in the text importance vector as a representation of a semantic importance of the constituent word in a spatial layout of the text phrase.

19. One or more non-transitory computer-readable media storing a plurality of executable instructions, which when executed by one or more processors, cause the one or more processors to perform operations comprising:

determining spatial layouts of constituent words of a text phrase, each spatial layout determined as a representation of the constituent words arranged based at least in part on designations of semantic emphasis of the constituent words in a text importance vector;

generating a plurality of feature vectors, each feature vector of the plurality of feature vectors represents a respective spatial layout of the text phrase and includes measurement properties of each of the constituent words in the respective spatial layout; and ranking the spatial layouts based on a metric that indicates a degree of similarity of the text importance vector to each feature vector of the plurality of feature vectors that represents the respective spatial layout.

20. The method as recited in claim 19, further comprising:
receiving a designation of a bounding box in which to constrain the spatial layouts of the text phrase; and determining one or more of the spatial layouts with the constituent words of the text phrase conformed within an aspect ratio of the bounding box.

* * * * *